US011697238B2

(12) United States Patent
Handa et al.

(10) Patent No.: US 11,697,238 B2
(45) Date of Patent: Jul. 11, 2023

(54) EXTRUDER AND DIE FOR THE SAME

(71) Applicant: The Japan Steel Works, Ltd., Tokyo (JP)

(72) Inventors: Kiyoshi Handa, Hiroshima (JP); Yohei Shimizu, Hiroshima (JP); Makoto Tojo, Hiroshima (JP); Jun Kakizaki, Hiroshima (JP)

(73) Assignee: THE JAPAN STEEL WORKS, LTD., Shinagawa-ku (JP)

( * ) Notice: Subject to any disclaimer, the term of this patent is extended or adjusted under 35 U.S.C. 154(b) by 112 days.

(21) Appl. No.: 16/760,799

(22) PCT Filed: Nov. 1, 2017

(86) PCT No.: PCT/JP2017/039477
§ 371 (c)(1),
(2) Date: Apr. 30, 2020

(87) PCT Pub. No.: WO2019/087324
PCT Pub. Date: May 9, 2019

(65) Prior Publication Data
US 2020/0338801 A1    Oct. 29, 2020

(51) Int. Cl.
*B29C 48/30* (2019.01)
*B29C 48/06* (2019.01)
*B29C 48/345* (2019.01)

(52) U.S. Cl.
CPC ........... *B29C 48/302* (2019.02); *B29C 48/06* (2019.02); *B29C 48/345* (2019.02)

(58) Field of Classification Search
None
See application file for complete search history.

(56) References Cited

U.S. PATENT DOCUMENTS

| 2015/0054192 A1* | 2/2015 | Nakahara ............... B29B 13/06 264/211.12 |
| 2016/0302467 A1 | 10/2016 | Baechtle et al. |
| 2017/0182701 A1 | 6/2017 | Ryan et al. |

FOREIGN PATENT DOCUMENTS

| CN | 102501333 A | 6/2012 |
| EP | 0 618 060 A1 | 10/1994 |

(Continued)

OTHER PUBLICATIONS

Machine translation of JP2014008653 A to Sekisui Plastics Co. Ltd. (Year: 2012).*

(Continued)

*Primary Examiner* — Robert J Grun
(74) *Attorney, Agent, or Firm* — Foley & Lardner LLP

(57) ABSTRACT

An extruder which can be applied to various types of resin and elastomer without having to replace a die is provided. An extruder of the present inventions has: a barrel to which raw material, that is raw elastomer or raw material resin, is supplied; a screw that is driven to rotate in the barrel in order to process the raw material together with the barrel; and die 5 that is provided at a discharge point of the barrel and that discharges the raw material that has been processed. Die 5 includes first flat plate 11 having at least one first hole 13 and second flat plate 12 having at least one second hole 14, wherein first flat plate 11 and second flat plate 12 are arranged adjacent to each other along longitudinal axis X1 of the barrel, and at least either first flat plate 11 or second flat plate 12 is movable relative to the other flat plate such that an overlapping part of first hole 13 and second hole 14 can be varied.

5 Claims, 5 Drawing Sheets

(56) References Cited

FOREIGN PATENT DOCUMENTS

| | | |
|---|---|---|
| EP | 3 081 089 A1 | 10/2016 |
| FR | 2541176 A1 | 8/1984 |
| JP | S56-128219 U | 9/1981 |
| JP | S58-082234 U | 6/1983 |
| JP | H08-224720 A | 9/1996 |
| JP | 2008-207436 A | 9/2008 |
| JP | 2010-184372 A | 8/2010 |
| JP | 2012-239999 A | 12/2012 |
| JP | 2013-086401 A | 5/2013 |
| KR | 20120050826 A | 5/2012 |

OTHER PUBLICATIONS

Chinese Office Action dated Jun. 11, 2021 in related Chinese Application No. 201780096407.0, 10 pages, with English machine translation.

International Search Report dated May 12, 2017 in PCT/JP2017/039477 with English-language translation (4 pgs.).

Saeki, Koji, "Processes of Manufacturing Polymer" pp. 272-275, Sekiyukagaku Kogyo Shuppankai, Dec. 1977.

* cited by examiner

EXTRUDER AND DIE FOR THE SAME

CROSS REFERENCE TO RELATED APPLICATION

This application is a national stage entry of International Appl. PCT/JP2017/039477, filed Nov. 1, 2017; the contents of which are incorporated by reference herein in their entirety.

TECHNICAL FIELD

The present invention relates to an extruder, particularly to a die that is used for an extruder.

BACKGROUND OF THE INVENTION

Background Art

Generally, in a screw extruder having a screw (hereinafter, simply referred to as an extruder), a die having holes for discharging resin or elastomer is used. The diameter and the number of the holes are selected in accordance with the operating condition of the extruder and in accordance with the characteristics of the resin or the elastomer that is discharged from the die (for example, JP2010-184372).

Since an extruder handles various kinds of raw material, each time the diameter or the number of the holes has to be changed, the die is replaced with one die whose holes have the appropriate diameter and number. However, conventionally, in order to obtain a stable discharge condition for each type of resin or elastomer, it is necessary to repeatedly replace the die and to select a die having holes with diameter and number that are suitable for the resin or the elastomer that is discharged from the die.

It is an object of the present invention to provide an extruder which can be applied to various types of resin and elastomer without having to replace a die An extruder of the present inventions comprises: a barrel to which raw material, that is raw elastomer or raw material resin, is supplied; a screw that is driven to rotate in the barrel in order to process the raw material together with the barrel; and a die that is provided at a discharge point of the barrel and that discharges the raw material that has been processed. The die includes a first flat plate having at least one first hole and a second flat plate having at least one second hole, wherein the first flat plate and the second flat plate are arranged adjacent to each other along a longitudinal axis of the barrel, and at least either the first flat plate or the second flat plate is movable relative to the other flat plate such that an overlapping part of the first hole and the second hole can be varied.

In the present invention, the opening in the die is formed as an overlapping part of the first hole and the second hole. At least either the first flat plate or the second flat plate is movable relative to the other flat plate such that the overlapping part of the first hole and the second hole can be varied. It is therefore possible to provide an extruder which can be applied to various types of resin and elastomer without having to replace a die.

DESCRIPTION OF EMBODIMENTS

Hereinafter, an extruder of the present invention will be described in detail with reference to an embodiment. The following embodiment is an example of the present invention and is not intended to limit the present invention. Although the embodiment is directed to a twin screw extruder, the present invention may also be applied to a uniaxial extruder, a multiaxial extruder, a uniaxial expansion dryer, a combination of a screw type dewaterer and an expansion dryer and the like.

Figure 1:
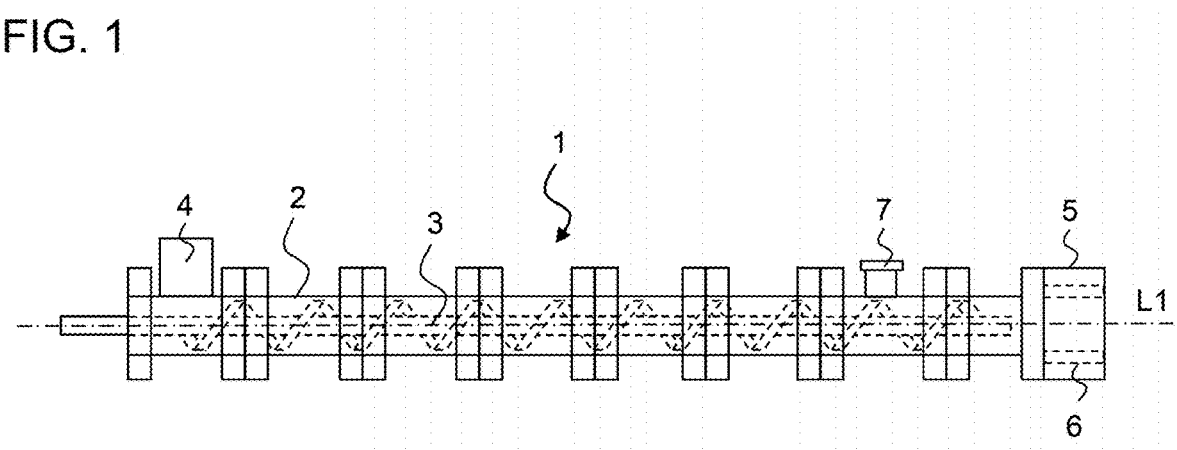
FIG. 1 is a side view of an extruder of the present invention.

FIG. 1 is a side view of twin screw extruder 1 according to an embodiment of the present invention. Twin screw extruder 1 has barrel 2 and two screws 3 that are driven to rotate in barrel 2. Two screws 3 extend in barrel 2 in parallel to longitudinal axis X1 of barrel 2. Hopper portion 4 that receives raw elastomer or raw resin (hereinafter, referred to as raw material) is formed near one of the end portions of barrel 2. Screws 3 knead the raw material while transporting the raw material. The discharge portion of barrel 2 is provided with die 5 that discharges the raw material that has been processed. Die 5 has opening 6 that discharges the raw material. Die 5 makes it possible to control the pressure of the raw material at the discharge portion of barrel 2. Vent opening 7 that discharges gas that is generated from the raw material is provided on the side wall of barrel 2 in the vicinity of the discharge portion.

Figure 2A:
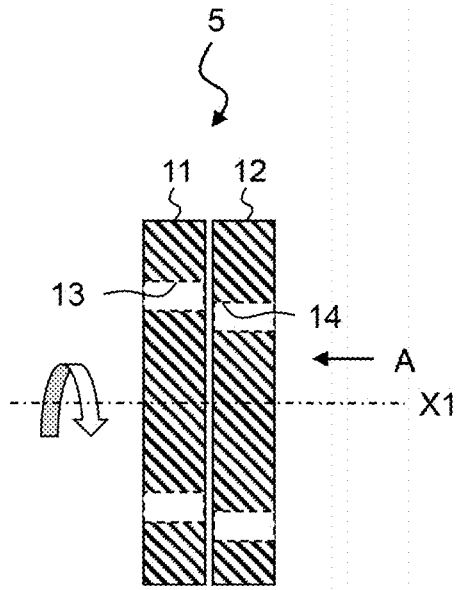
FIG. 2A is a cross-sectional view of a die.
Figure 2B:
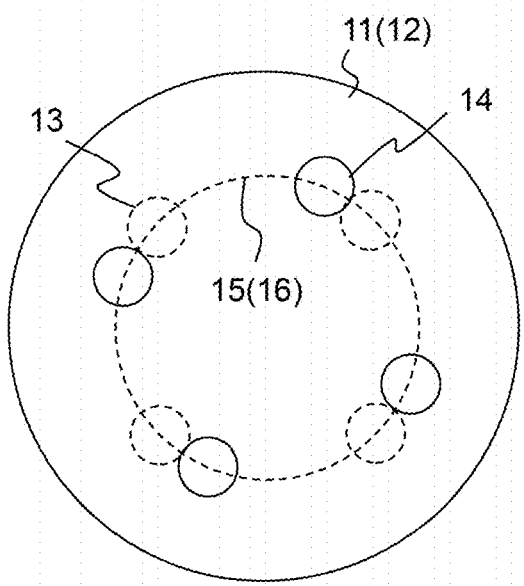
FIG. 2B is a side view of the die.

FIGS. 2A and 2B schematically show the configuration of die 5. FIG. 2A is a cross-sectional view of the die, and FIG. 2B shows a side view, as viewed from direction A in FIG. 2A. Die 5 includes first and second flat plates 11, 12 that are coaxial with barrel 2 and that are arranged adjacent to each other along longitudinal axis X1 of barrel 2. In the present embodiment, first and second flat plates 11, 12 are both concentric circular plates. First flat plate 11 faces the inner space of barrel 2, and second flat plate 12 faces the outside of barrel 2. First flat plate 11 and second flat plate 12 are arranged such that they overlap with each other along the flow direction of the raw material, i.e. longitudinal axis X of barrel 2.

First flat plate 11 has a plurality of first holes 13. Second flat plate 12 has a plurality of second holes 14. Holes 13, 14 are through-holes that form opening 6 of the die. The cross-section of holes 13, 14 is circular, but is not limited thereto, and may be square, hexagonal, elliptical and the like. The number and arrangement of holes 13, 14 of first flat plate 11 is the same as the number and arrangement of holes 13, 14 of second flat plate 12. More specifically, four first holes 13 are provided at 90° intervals along first circle 15, that is concentric with barrel 2, on first flat plate 11, and four second holes 14 are provided at 90° intervals along second circle 16, that is concentric with barrel 2, on second flat plate 12. First circle 15 and second circle 16 have the same diameter and completely overlap with each other, as viewed in direction A in FIG. 2A.

Figure 2C:
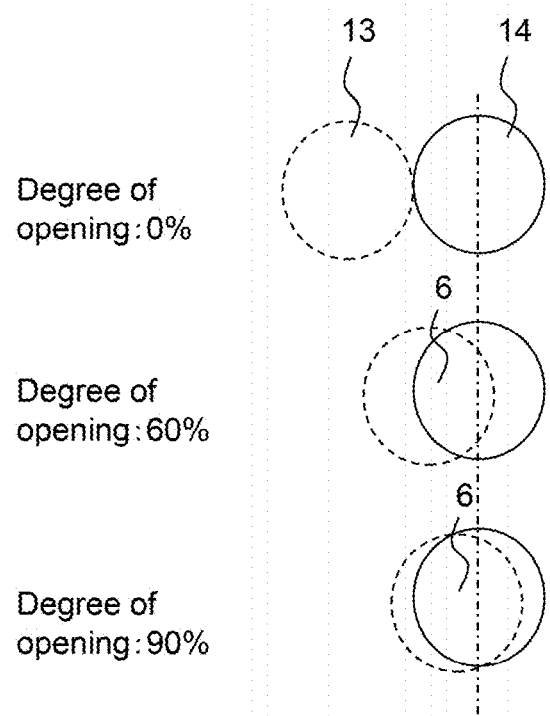
FIG. 2C is a conceptual diagram showing various degrees of opening of the opening.

First flat plate 11 can be rotated about longitudinal axis X1 of barrel 2 by means of a rotational drive mechanism, not shown, and second flat plate 12 is fixed to barrel 2. In another embodiment, first flat plate 11 is fixed to barrel 2, and second flat plate 12 can be rotated about longitudinal axis X1 of barrel 2 by a rotational drive mechanism, not shown. Alternatively, both first flat plate 11 and second flat plate 12 may be rotated about longitudinal axis X1 of barrel 2. In any of these configurations, at least either first flat plate 11 or second flat plate 12 is rotatable about longitudinal axis X1 of barrel 2 with respect to the other circular plate. Depending on the relative rotational angles of first flat plate 11 and second flat plate 12, the overlapping part of first holes 13 of first flat plate 11 and second holes 14 of second flat plate 12, that is, the area of opening 6, varies. In the upper figure of FIG. 2C, first hole 13 of first flat plate 11 and second hole 14 of second flat plate 12 do not overlap, and the degree of opening of opening 6 is 0%. In the middle figure of FIG. 2C, first hole 13 of first flat plate 11 and second hole 14 of second flat plate 12 partially overlap, and the degree of opening of opening 6 is 60%. In the lower figure of FIG. 2C, first hole 13 of first flat plate 11 and second hole 14 of second flat plate 12 further overlap, and the degree of opening of opening 6 is 90%. By adjusting the difference of the rotational angles of first flat plate 11 and second flat plate 12, the degree of opening of opening 6 can be continuously set. The range of rotation of first flat plate 11 or second flat plate 12 is set such that the degree of opening of opening 6 can be adjusted between 0% (fully closed) and 100% (fully open). Since the optimum pressure to be applied to the raw material varies depending on the types of the raw material, the flow channel area or the degree of opening of opening 6 is appropriately adjusted so as to obtain the optimum pressure.

The shapes of first and second flat plates 11, 12 are not limited to a circular plate, and various shapes can be used for the flat plate. The number of the circular plates is not limited to two, which is the case in the embodiment. The size and arrangement of the holes are not limited to the above-described embodiment. The holes may be provided along a plurality of concentric circles. As long as the flow channel area or the degree of opening of opening 6 can be adjusted by the relative movement of first flat plate 11 and second flat plate 12, the circular plate may slide linearly. The number of the holes is not limited to the above-described embodiment, and at least one hole may be provided on each of first flat plate 11 and second flat plate 12.

Figure 3:
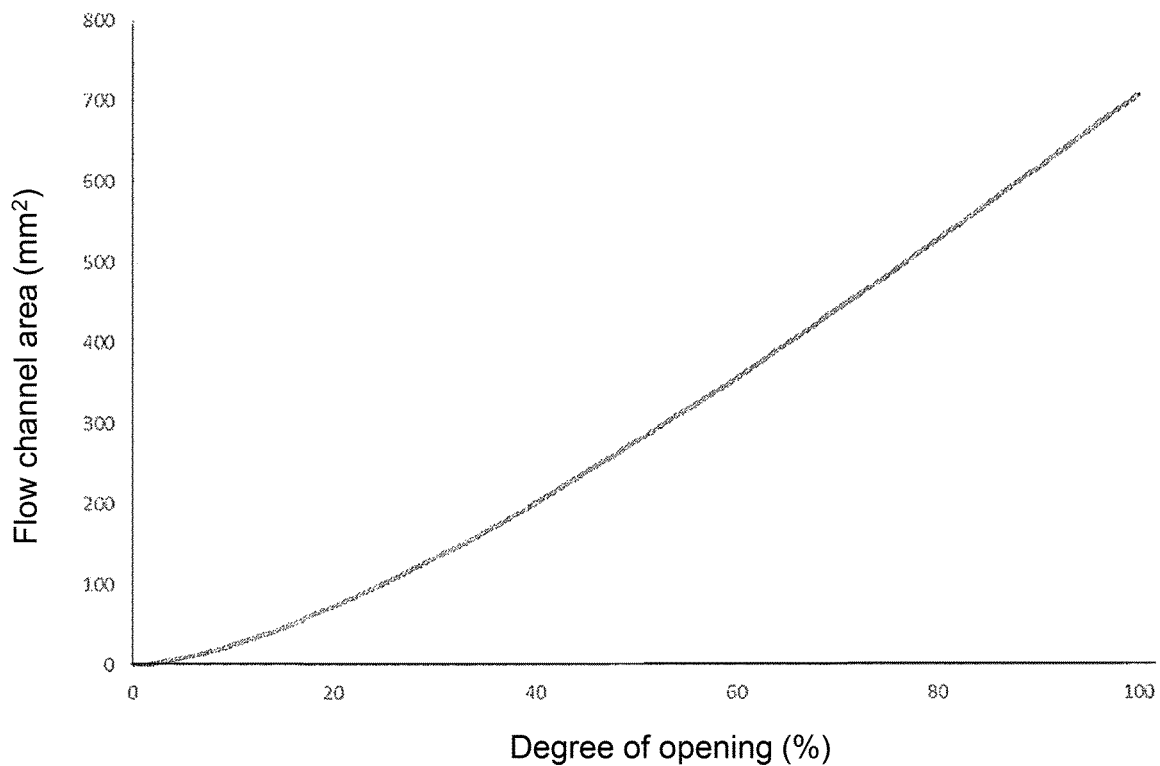
FIG. 3 is a graph showing the relationship of the flow channel area to the degree of opening of the opening in the example.
Figure 4:
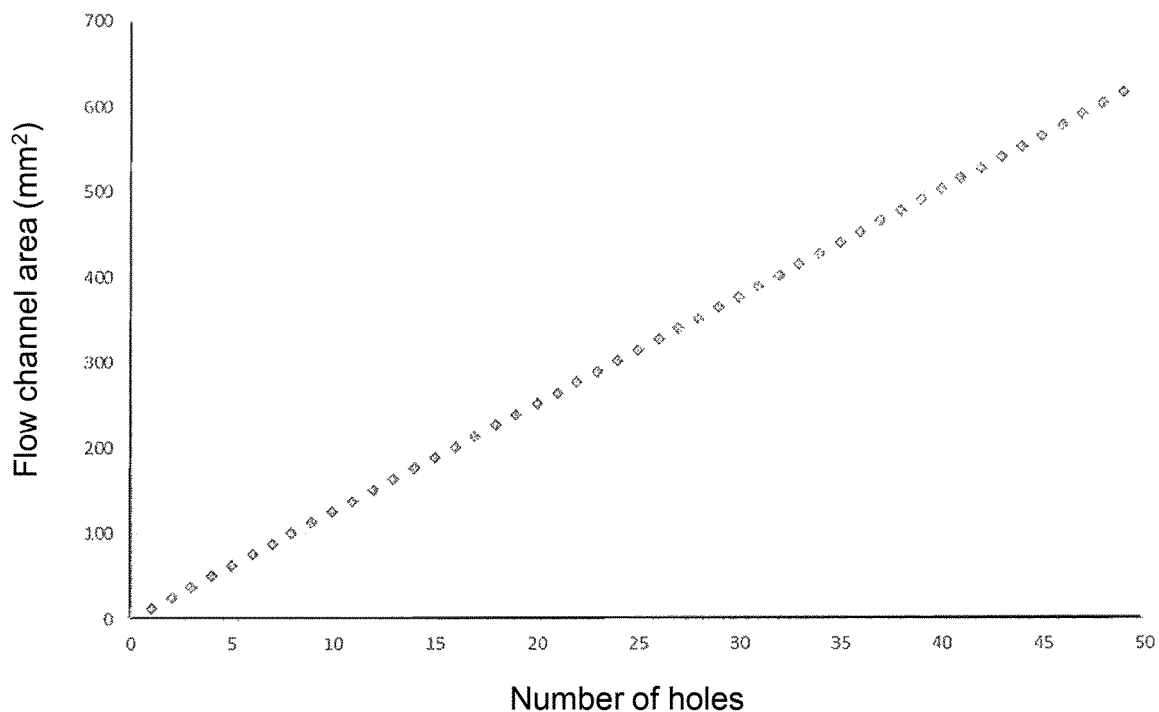
FIG. 4 is a graph showing the relationship of the flow channel area to the number of holes in the comparative example.

Next, the flow channel area of the opening is compared between an example and a comparative example. The die of the example is the same as that shown in FIGS. 2A and 2B. First flat plate 11 and second flat plate 12 both have four holes of $\phi 15$ mm, and the degree of opening of the opening can be continuously adjusted. In the die of the comparative example, the required number of holes of $\phi 4$ mm are provided in accordance with the required flow channel area. FIG. 3 shows the relationship of the flow channel area to the opening degree of the opening in the example. The degree of opening of the opening corresponds to the operation amount of the rotational drive mechanism, and the operation amount is uniformly allocated between 0, which corresponds to the fully closed state of the opening, and 100, which corresponds to the fully open state of the opening. The flow channel area shows a quadratic change with respect to the degree of opening of the opening. FIG. 4 shows the relationship of the flow channel area to the number of the holes in the comparative example. The flow channel area is in proportion to the number of the holes. A desired flow channel area can be obtained by adjusting the degree of the opening in the example. On the other hand, in the comparative example, the flow channel area that can be obtained is limited to an integral multiple of the cross-sectional area of the hole, and in some cases, only an approximate value of a desired value can be obtained.

The discharge pressure of barrel 2 (the pressure near the inlets of the holes of die 5 in barrel 2) must be accurately controlled. If the discharge pressure is high, then a tightly-packed long region is required between the screw end and the die. This may increase the temperature of the raw material while it is transported through the tightly-packed region and may degrade the raw material. If a tightly-packed long region is provided, the raw material may leak out from vent opening 7 of barrel 2 to the outside of the system, and the operation may have to be stopped. On the other hand, if the discharge pressure is too low, then the raw material is discharged from the opening of the die in an unstable manner. This may result in uneven discharging and unstable forming of the resin in the subsequent pelletizing process. In the present embodiment, a desired flow channel area and a desired discharge pressure can be accurately set because either one of the two flat plates is continuously rotated. In addition, unlike the comparative example, it is not necessary to replace a die with a die having a different number of holes in order to obtain a desired flow channel area.

Furthermore, the extruder of the present invention may be suitably applied to an expansion dewaterer that dewaters and dries water-containing raw material, such as water-containing thermoplastic resin or water-containing elastomer. When water-containing raw material, e.g. water-containing thermoplastic resin, is dewatered and dried, the fluidity of the resin that is caused by vapor pressure should be considered, unlike a common molten resin. In this case, it is difficult to adjust the discharge pressure. For example, in case of water-containing thermoplastic resin, water evaporates easily due to the rise in temperature of the resin in the region between the screw and the discharge portion of barrel 2. If molten raw material that contains vapor is ejected from the holes due to the vapor pressure in a short time, then the density of the raw material in the barrel will be reduced. Thereafter, the raw material accumulates in the barrel until the pressure is restored at the discharge point, and the pressurized and heated raw material is ejected from the die again. Such a process in which the ejection of the raw material is intermittently repeated results in a very unstable extrusion process. In addition, since the water that is contained in the raw material is also ejected at the same time, the temperature of the discharged resin is lowered, and the resin is less likely to be dried after it is discharged. If a die is suitably selected for the raw material, then these states stably change. However, determining a suitable die for a raw material requires testing of various dies, and it is very cumbersome to determine the optimal die for each of the various brands.

Since the degree of opening of opening 6 can be continuously adjusted in the embodiment, the discharge pressure can be accurately adjusted in accordance with the characteristics of the raw material that passes through the die. Therefore, the water-containing resin or the water-containing elastomer that is discharged from the die can be stably pushed out. As a result, the residual water percentage and the quality of the resin that is discharged from the extruder are stabilized. In addition, since the raw material is stably discharged from the die, water that is contained in the raw material stably evaporates, and accordingly, the raw material is stably cooled. Therefore, it is possible to prevent the resin from deteriorating and to reduce the amount of energy required for cooling.

Figure 5A:
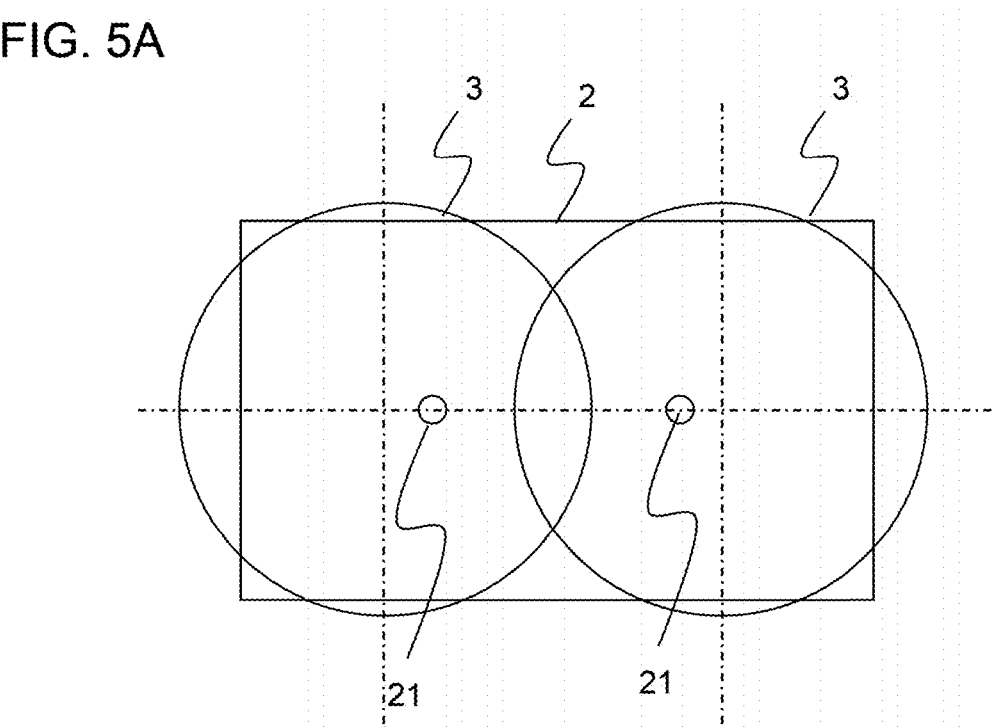
FIG. 5A is a diagram showing the arrangement of holes in Comparative Example 1.
Figure 5B:
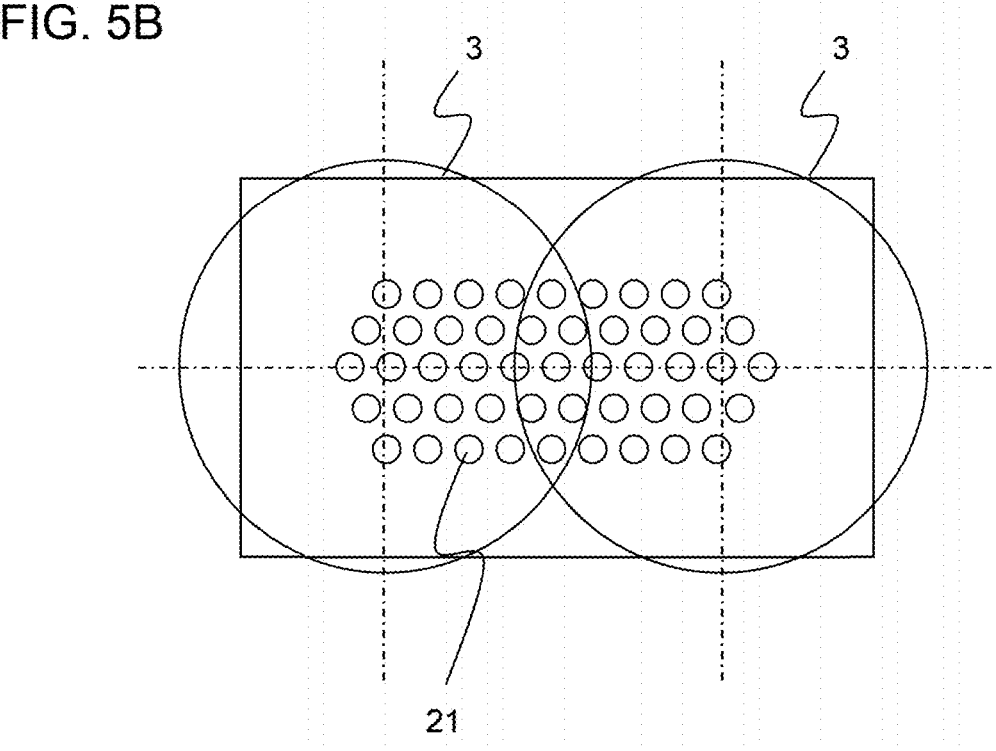
FIG. 5B is a diagram showing the arrangement of holes in Comparative Example 2.
Figure 6:
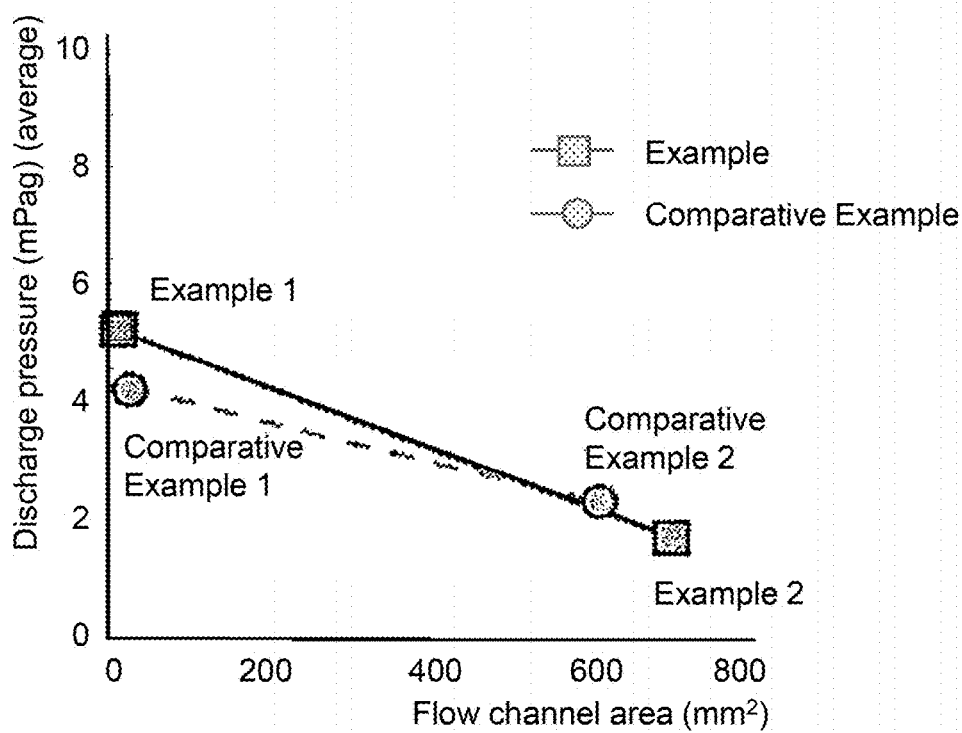
FIG. 6 is a graph showing the relationship of the discharge pressure to the flow channel area.
Figure 7:
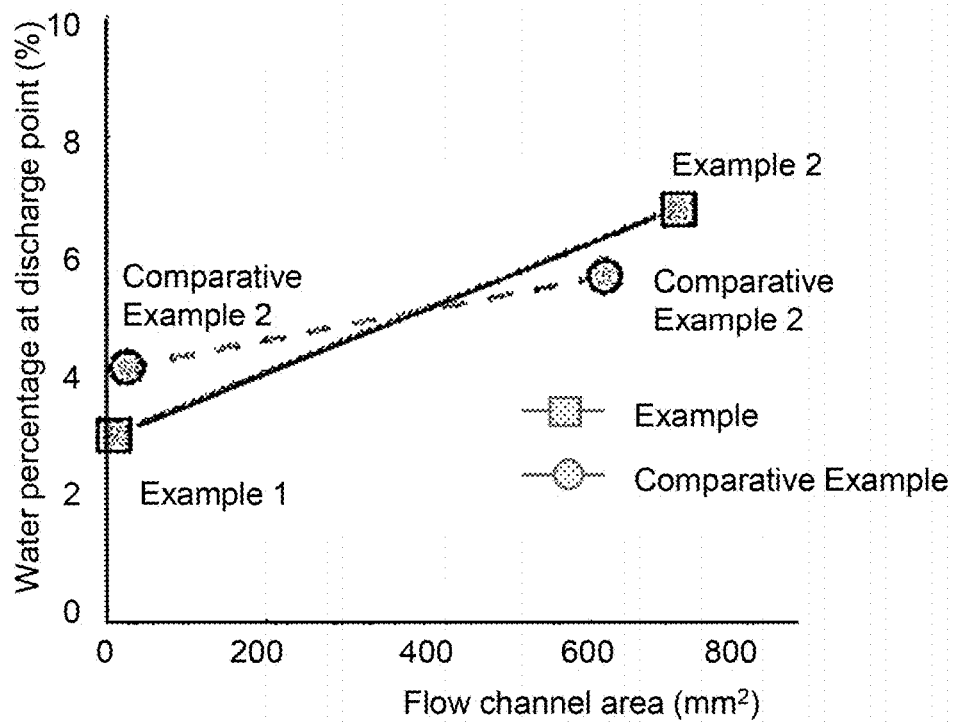
FIG. 7 is a graph showing the relationship of the water percentage at the discharge point to the flow channel area.

Next, the dies of Examples and Comparative Examples were attached to a twin screw extruder TEX65αII manufactured by The Japan Steel Works Ltd., and water-containing resin (water percentage is about 50 wt %) was kneaded. In the dies of Examples, the degree of opening was set at 5% (Example 1) and 100% (Example 2). In the dies of Comparative Examples, two holes (Comparative Example 1) and 49 holes (Comparative Example 2) were provided. The arrangements of holes 21 of Comparative Example 1 and Comparative Example 2 are shown in FIGS. 5A and 5B. The twin screw extruder was operated under the same condition for Examples 1 and 2 and Comparative Examples 1 and 2. Table 1 shows the results. In the table, the water percentage at the discharge point means residual water percentage in the resin that was discharged from the die. FIG. 6 shows the relationship of the discharge pressure to the flow channel area, and FIG. 7 shows the relationship of the water percentage at the discharge point to the flow channel area. The discharge pressure increases as the flow channel area decreases. This is because high pressure is maintained upstream of the die due to the restricted flow channel area. In Comparative Example 1, since the pressure of the water-containing resin is not sufficiently maintained upstream of the die, as compared to Example 1, the temperature of the resin in the die is lowered, and the residual water percentage in the discharged resin is higher than that in Example 1. In order to limit the residual water percentage in the resin that is discharged from the die, it is necessary to adjust the flow channel area with high accuracy. Thus, the die of Examples that is capable of precisely adjusting the flow channel area can be suitably used.

TABLE 1

| Die | | Example 1 ϕ15 mm × 4 | Example 2 ϕ15 mm × 4 | Comp. Example 1 ϕ4 mm × 2 | Comp. Example 2 ϕ4 mm × 15 |
| --- | --- | --- | --- | --- | --- |
| Degree of opening | % | 5 | 100 | Adjustment Mechanism not provided | |
| Flow channel area | mm$^2$ | 9 | 707 | 25 | 616 |
| Discharge pressure | MPag | 5.3 | 1.8 | 4.3 | 2.4 |
| Resin temp. in die | °C. | 130 | 126 | 120 | 127 |
| Water percentage at discharge point | weight % | 3.1 | 6.8 | 4.2 | 5.7 |

REFERENCE SIGNS

1 Dewaterer
2 Barrel
3 Screw
4 Hopper portion
5 Die
7 Opening
11 First flat plate
12 Second flat plate
13 First hole
14 Second hole

The invention claimed is:

1. An extruder comprising: a barrel to which raw material is supplied; a screw that is driven to rotate in the barrel in order to process the raw material together with the barrel; and a die that is provided at a discharge point of the barrel and that discharges the raw material that has been processed, wherein the die includes a first flat plate having at least one first hole and a second flat plate having at least one second hole, wherein the first flat plate and the second flat plate are arranged adjacent to each other along a longitudinal axis of the barrel, and at least either the first flat plate or the second flat plate is configured to be continuously movable relative to the other flat plate such that an overlapping part of the first hole and the second hole is configured to be varied continuously between 0% overlap and 100% overlap, and the first and second flat plates are concentric, at least either the first flat plate or the second flat plate is rotatable about the longitudinal axis of the barrel, and all of the at least one first hole and the at least one second hole are arranged remote from the longitudinal axis of the barrel.

2. The extruder according to claim 1, wherein the first and second flat plates are coaxial circular plates, and at least either the first flat plate or the second flat plate is rotatable about a central axis of the first and second flat plates.

3. The extruder according to claim 2, wherein the first hole and the second hole are arranged along respective circles that are concentric with the first and second flat plates and that have a same diameter.

4. The extruder according to claim 1, wherein a flow channel area of an opening that is formed by the at least one first hole and the at least one second hole can approach zero.

5. A die for an extruder, wherein the extruder comprises a barrel to which raw material is supplied, and a screw that is driven to rotate in the barrel in order to process the raw material together with the barrel, wherein the die is provided at a discharge point of the barrel of the extruder and discharges the raw material that has been processed, wherein the die includes a first flat plate having at least one first hole and a second flat plate having at least one second hole, wherein the first flat plate and the second flat plate are arranged adjacent to each other along a longitudinal axis of the barrel, and wherein at least either the first flat plate or the second flat plate is configured to be continuously movable relative to the other flat plate such that an overlapping part of the first hole and the second hole is configured to be varied continuously between 0% overlap and 100% overlap, and the first and second flat plates are concentric, at least either the first flat plate or the second flat plate is rotatable about the longitudinal axis of the barrel, and all of the at least one first hole and the at least one second hole are arranged remote from the longitudinal axis of the barrel.

* * * * *